No. 636,920. Patented Nov. 14, 1899.
B. McKIERNAN.
WEIGHING SCOOP.
(Application filed May 23, 1899.)
(No Model.)
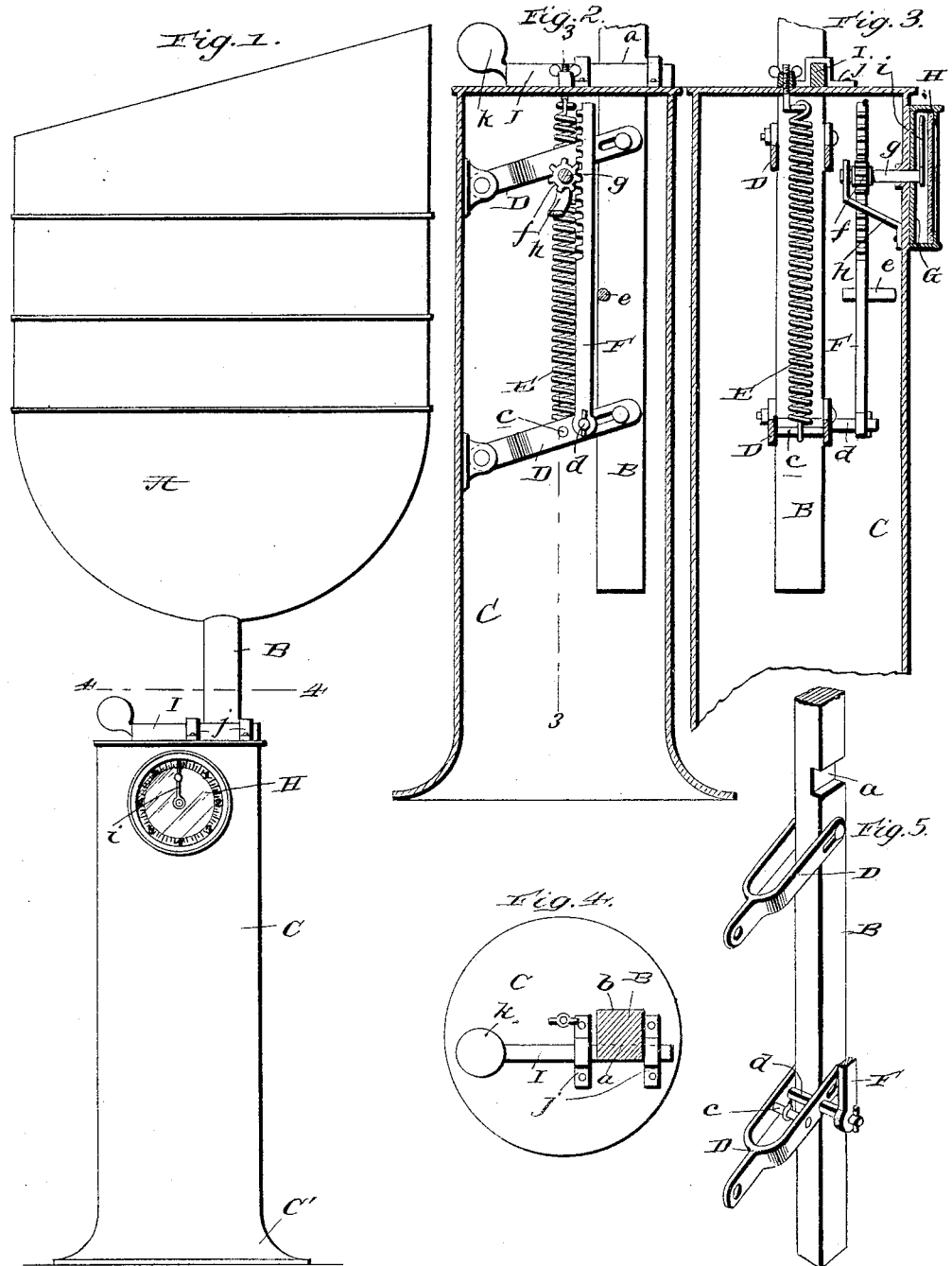
WITNESSES:
INVENTOR.
B. McKiernan
BY James J Sheehy
ATTORNEY.
THE NORRIS PETERS CO., PHOTO-LITHO., WASHINGTON, D. C.

UNITED STATES PATENT OFFICE.

BERNARD McKIERNAN, OF STOCKTON, CALIFORNIA.

WEIGHING-SCOOP.

SPECIFICATION forming part of Letters Patent No. 636,920, dated November 14, 1899.

Application filed May 23, 1899. Serial No. 717,897. (No model.)

*To all whom it may concern:*

Be it known that I, BERNARD MCKIERNAN, a citizen of the United States, residing at Stockton, in the county of San Joaquin and State of California, have invented new and useful Improvements in Weighing-Scoops, of which the following is a specification.

My invention relates to weighing-scoops, and contemplates the provision of a scoop embracing a simple and inexpensive construction whereby it is enabled to weigh accurately when it is held in an inclined position, as well as when it is held or supported in a perfectly upright position.

The invention also contemplates the provision of a weighing-scoop which is adapted to stand upright on a table or other support and be used after the manner of an ordinary scale.

With the foregoing ends in view the invention will be fully understood from the following description and claim when taken in conjunction with the annexed drawings, in which—

Figure 1 is an elevation of my improved weighing-scoop. Fig. 2 is an enlarged longitudinal section of the hollow handle of the same. Fig. 3 is a detail section taken in the plane indicated by the line 3 3 of Fig. 2. Fig. 4 is an enlarged section taken in the plane indicated by the line 4 4 of Fig. 1. Fig. 5 is a detail perspective view, on an enlarged scale, of the stem of the scoop-body.

In the said drawings similar letters designate corresponding parts in all of the several views, referring to which—

A is the scoop-body, and B the stem thereof, said stem being provided with a kerf *a* for a purpose presently described.

C is the hollow handle, which is preferably of sheet metal and of the shape shown in cross-section. The said handle is provided at its outer end with a flared portion C', which is designed to serve as a guard to prevent the handle slipping from the hand of the user and also as a base to support the scoop in an upright position when said scoop is placed on a table or the like and used after the manner of an ordinary scale.

The stem B of the scoop-body A extends loosely through an aperture *b* in the inner end of the handle C and is connected to said handle through the medium of links D, arranged one above the other. These links are pivotally connected at one end to the handle, and their opposite ends are bifurcated and loosely connected to the stem, as shown.

To a cross-bar *c*, bridging the bifurcation of the lower link D, is connected one end of a coiled spring E, which is connected at its opposite end to the inner end of the handle C and has for its purpose to yieldingly sustain the scoop-body A with respect to the said handle. The bifurcated portion of the lower link D is also provided with a cross-bar *d*, which extends laterally therefrom and serves for the connection of a rack-bar F. This rack-bar extends upwardly from the lower link D and is held by a stop *e* in engagement with a pinion *f*, fixed in a shaft *g*, as best shown in Fig. 3.

The shaft *g* is journaled in the handle C and in a bracket *h*, connected to said handle. It is provided at its outer end with a pointer *i*, arranged and adapted to move in front of a dial G in a casing H, attached to the outer side of the handle.

I is a latch movable in guide-straps *j* on the inner end of handle C. This latch is provided with a finger-piece *k* and is designed to be arranged in the kerf *a* of stem B, as shown in Fig. 2, so as to remove strain from the weighing mechanism when it is desired to use the device simply as a scoop. When, however, the scoop is to be used for weighing purposes, the latch is moved endwise out of the kerf *a* to permit free movement of the scoop-body with respect to the handle C.

In using my improved weighing-scoop the operator grasps it by the handle C and manipulates it in the usual manner to take up sugar, flour, or other substance in the body A. The scoop may be thus manipulated with the stem B fixed to the handle through the medium of the latch I or movable with respect to said handle, as desired. After sugar or other substance is taken up in the scoop-body A, as stated, the stem B is released, if fastened by latch I, and the scoop is held in an upright or substantially upright position until the user by reference to the indicator ascertains the weight of the sugar or other substance, when the scoop-body is dumped.

By virtue of the stem B being connected to handle C through links D and the rack-bar F being connected to one of the links the substance in the body A will be accurately weighed when the scoop is held in an inclined position as well as when it is held in a perfectly upright position. Such manner of connecting the stem B with the handle is also advantageous, because it permits of the parts being cheaply made and assembled by unskilled labor without impairing the accuracy of the weighing mechanism.

When it is desired to use the weighing-scoop after the manner of an ordinary scale, the scoop is placed in an upright position on a table or other support, as shown in Fig. 1.

Having thus described my invention, what I claim is—

The herein-described weighing-scoop consisting essentially of the body having a stem provided in one side with a kerf $a$, the hollow handle having its outer end open and provided with the flared portion C', and also having an aperture in its inner end loosely receiving the stem of the body, the endwise-movable latch mounted in guides on the inner end of the handle and adapted to enter the kerf of the stem, the links arranged one above the other in the hollow handle and pivotally connected at one end to said handle and having bifurcated portions at their opposite ends receiving and loosely connected to the stem, a coiled spring connected at one end to a bar bridging the bifurcated portion of the upper link and connected at its upper end to the inner end of the handle, a dial arranged on the handle, a shaft or arbor journaled in the handle and in a bracket connected thereto and provided with a pinion and also with a pointer movable in front of the dial, and a rack-bar pivotally connected to the lower link and engaging the pinion, substantially as specified.

In testimony whereof I have hereunto set my hand in presence of two subscribing witnesses.

BERNARD McKIERNAN.

Witnesses:
   H. W. SPURR,
   H. O. SOUTHWORTH.